United States Patent [19]

Ishida et al.

[11] Patent Number: 4,490,846

[45] Date of Patent: Dec. 25, 1984

[54] PATTERN DISCRIMINATING APPARATUS

[76] Inventors: Tsuyoshi Ishida, 16-3, Hirakawa-cho, Kanagawa-Ku; Hideo Osawa, 2006-10, Nakata-cho, Totsuka-ku, both of Yokohama-shi; Kazuaki Naruse, 4-23-8, Kamirenjaku, Mitaka-shi, Tokyo, all of Japan

[21] Appl. No.: 330,642

[22] Filed: Dec. 14, 1981

[30] Foreign Application Priority Data

| | | | |
|---|---|---|---|
| Dec. 16, 1980 | [JP] | Japan | 55-176493 |
| May 27, 1981 | [JP] | Japan | 56-79420 |
| May 27, 1981 | [JP] | Japan | 56-79421 |
| May 28, 1981 | [JP] | Japan | 56-80067 |

[51] Int. Cl.[3] .......... G06K 9/44

[52] U.S. Cl. .......... 382/7; 382/29

[58] Field of Search .......... 194/4 R; 209/534; 324/76 A; 382/29, 7, 14

[56] References Cited

U.S. PATENT DOCUMENTS

| | | | |
|---|---|---|---|
| 3,202,761 | 8/1965 | Bibbero | 381/43 |
| 3,541,508 | 9/1966 | Vaccaro | 382/7 |
| 3,953,793 | 4/1976 | Nilsson | 324/76 A |
| 4,041,456 | 8/1977 | Ott | 382/7 |
| 4,072,928 | 2/1978 | Wilder | 382/14 |
| 4,125,858 | 11/1978 | Hounsfield et al. | 382/54 |
| 4,148,010 | 4/1979 | Shiau | 382/7 |
| 4,179,685 | 12/1979 | O'Maley | 382/7 |
| 4,348,656 | 9/1982 | Gorgone et al. | 382/7 |

*Primary Examiner*—Leo H. Boudreau
*Assistant Examiner*—E. A. McDowell
*Attorney, Agent, or Firm*—Cushman, Darby & Cushman

[57] ABSTRACT

A pattern discriminating apparatus with an interval integrating section for integrating detection signals from a detecting section for each of a number of intervals of a bill. A bill is supplied to the detecting section which detects, for example, a magnetism pattern of the bill. The detection signal from the detecting section is supplied to the interval integrating section as well as to a total integrating section. The total integrating section integrates the detection signals for one bill. The signals from the interval integrating section are temporarily stored in a memory section, are supplied to a smoothing section, and are smoothed thereby. The smoothed signal is supplied to normalizing section to be normalized based on the signal supplied from the total integrating section. The normalized signal and a signal output from a pattern memory section are supplied to a subtracting section for taking the difference between these two signals for each of the intervals. The difference signal thus obtained from the subtracting section is integrated in a difference integrating section for each interval and is then supplied to a discriminating section. Based on the signal from the difference integrating section, the discriminating section discriminates the authenticity, denomination and top or bottom surface of the bill.

13 Claims, 42 Drawing Figures

FIG. 8A
FIG. 8B
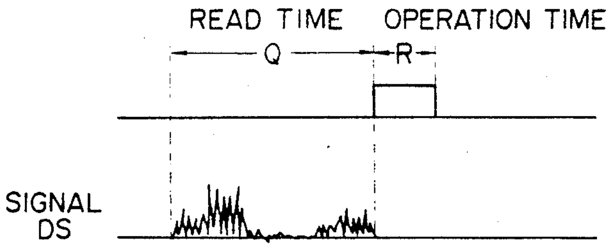
FIG. 9A
FIG. 9B
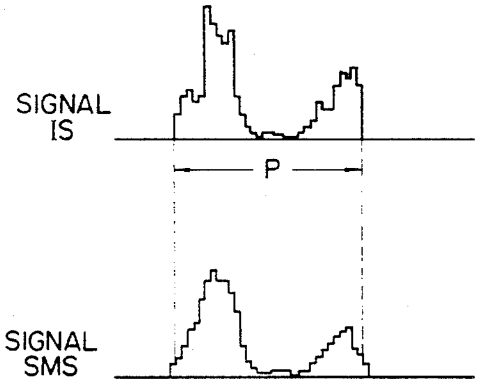
FIG. 10A
FIG. 10B
FIG. 10C
FIG. 10D
FIG. 10E
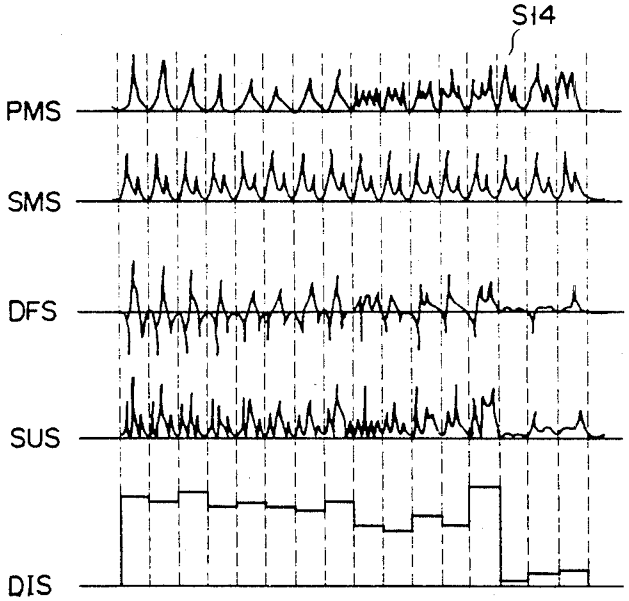

FIG. 13
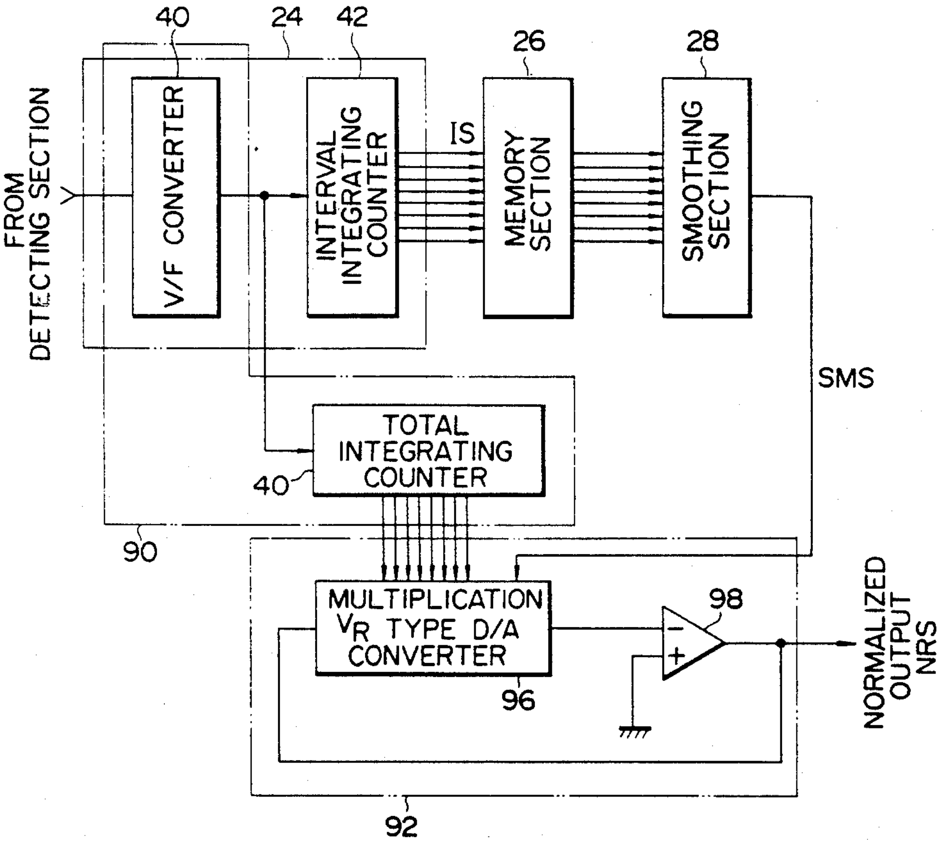
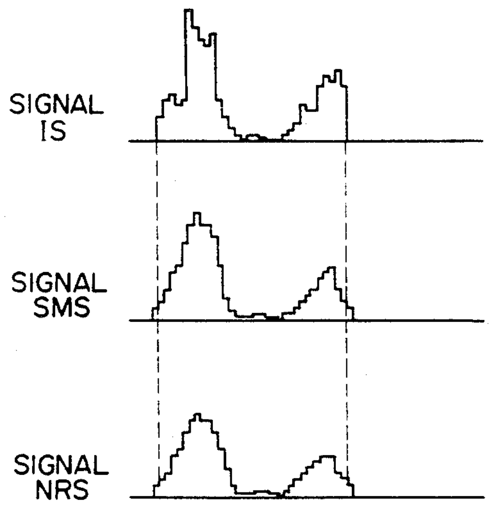
FIG. 14A
FIG. 14B
FIG. 14C

FIG. 17A
FIG. 17B
FIG. 17C
FIG. 17D
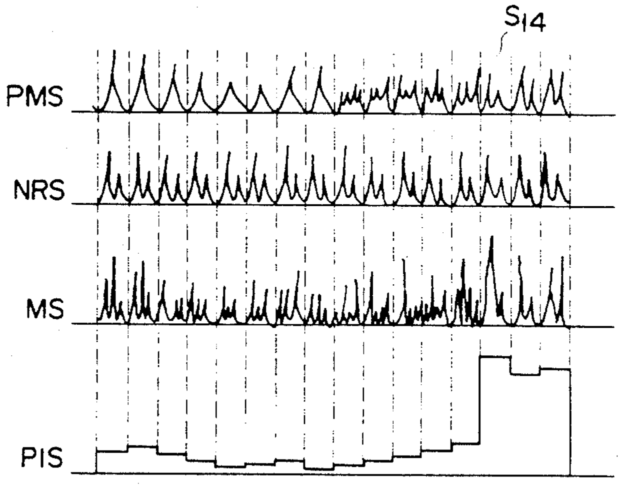
FIG. 19
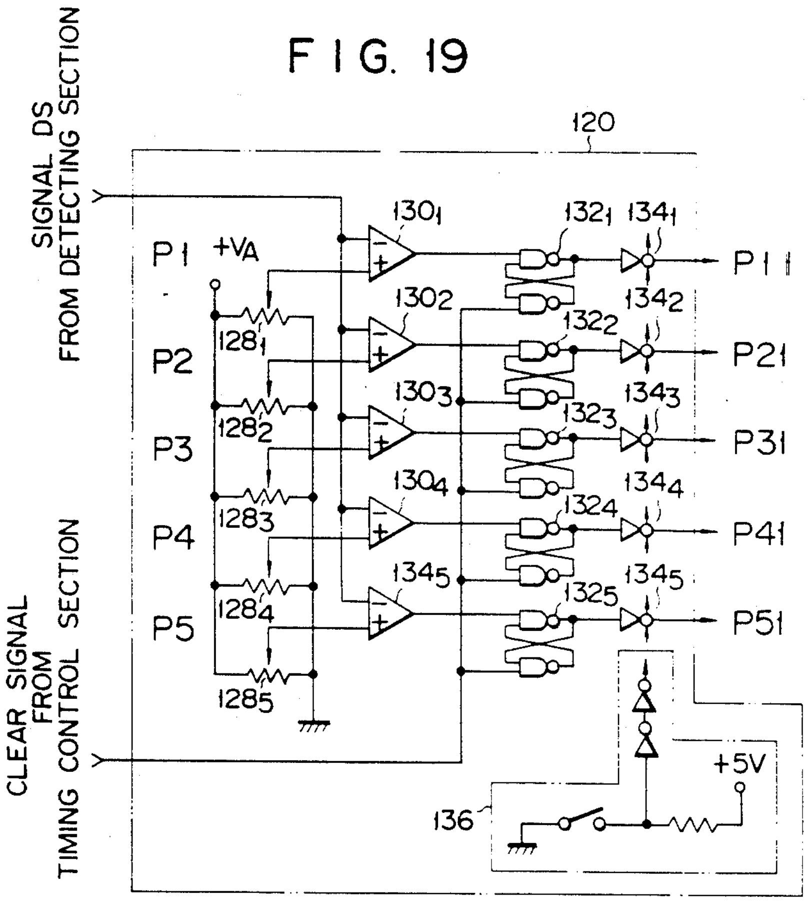

PATTERN DISCRIMINATING APPARATUS

BACKGROUND OF THE INVENTION

The present invention relates to a pattern discriminating apparatus and, more particularly, to a pattern discriminating apparatus with improved discriminating precision.

A paper currency discriminating apparatus is known as a pattern discriminating apparatus of this type. FIG. 1 is a block diagram schematically showing the configuration of a conventional paper currency discriminating apparatus. Referring to FIG. 1, a detecting section 10 magnetically and optically detects the characteristics of a bill to be discriminated by such characteristics as magnetism, color, and intensity, and converts the detection results to an electric signal. An integrator 12 integrates the output signal from the detecting section 10 for all over the bill to be discriminated. An upper limit setting section 14 sets the upper limit of the output of the integrator 12 for a fit bill. A lower limit setting section 16 sets the lower limit of the output of the integrator 12 for the fit bill. A comparator 18 compares the output from the integrator 12 with the output from the upper limit setting section 14. A comparator 20 compares the output from the integrator 12 with the output from the lower limit setting section 16. A discriminating section 22 discriminates the authenticity, denomination, top or bottom surface and so on based on the comparison results from the comparators 18 and 20. The upper and lower limit setting sections 14 and 16 and the comparators 18 and 20 are incorporated in numbers corresponding to the number of different denomination of bills to be handled.

However, with a conventional paper currency discriminating apparatus of this type, as may be seen from FIG. 1, discriminations are made on authenticity, denomination, top or bottom surface and so on based only on the integrated value corresponding to all over the bill to be discriminated. Therefore, the paper currency discriminating apparatus of this type cannot discriminate between two groups of paper currency of different denominations for which the detection signals for magnetic strength or the like are different but for which the integrated value of these detection signals for each group of paper currency is the same. Furthermore, the paper currency discriminating apparatus of this type is also defective in that it cannot perform correct discrimination if there are variations in the pattern intensity of the bills or variations in the sensitivity of the detecting section.

SUMMARY OF THE INVENTION

It is an object of the present invention to provide a pattern discriminating apparatus which is capable of more correctly discriminating the pattern of paper currency involved.

This object has been attained by a pattern discriminating apparatus which comprises detecting means for detecting a pattern of at least one property among properties of an object to be discriminated; first integrating means for integrating detection signals from said detecting means for each of a plurality of intervals of a readout surface of the object to be discriminated, said plurality of intervals being divided along the direction of movement of the object to be discriminated; first memory means for storing signals for all of the intervals of the readout surface, each signal output from said first integrating means and representing an interval integrated value, and for outputting the signals stored as data signals during readout; second memory means for storing, in advance, an integrated value corresponding to a reference pattern of the property detected by said detecting means for each of the intervals and for outputting the integrated values as reference signals during readout; operating means for calculating for each of the intervals a comparison value between waveform patterns of the data signals output by said first memory means and waveform patterns of the reference signals output by said second memory means; second integrating means for integrating the comparison values of the waveform patterns obtained by said operating means for all of the intervals of the object to be discriminated; and discriminating means for discriminating coincidence between the reference pattern and the pattern of the property of the readout surface of the object to be discriminated.

According to the present invention, an object to be discriminated is divided into a plurality of intervals along the direction of its movement, detection signals, for a pattern of a predetermined property of the object to be discriminated, are integrated for each of these intervals to provide respective integration patterns, and these integration patterns are compared with reference patterns for the respective intervals, so that the pattern of the predetermined property of the object to be discriminated is discriminated to correspond to the reference pattern for this property. According to the present invention, unlike the conventional apparatus as shown in FIG. 1, the pattern of the desired property of the object may be more correctly discriminated.

BRIEF DESCRIPTION OF THE DRAWINGS

By way of example and to make the description clearer, reference is made to the accompanying drawings in which:

FIGS. 8A, 8B, 9A, 9B and 10A to 10E show waveforms for explaining the mode of operation of the apparatus according to the first embodiment of the present invention;

FIG. 13 is a block diagram schematically showing the configuration of a normalizing section 92 shown in FIG. 11 together with connections to the other sections;

FIGS. 14A to 14C show waveforms for explaining the operation of the normalizing section 92;

FIGS. 17A to 17D show waveforms for explaining the operation of the apparatus of the third embodiment;

FIG. 19 is a circuit diagram showing the configuration of a peak level comparator 120 shown in FIG. 18;

DETAILED DESCRIPTION OF THE PREFERRED EMBODIMENTS

Figure 1:
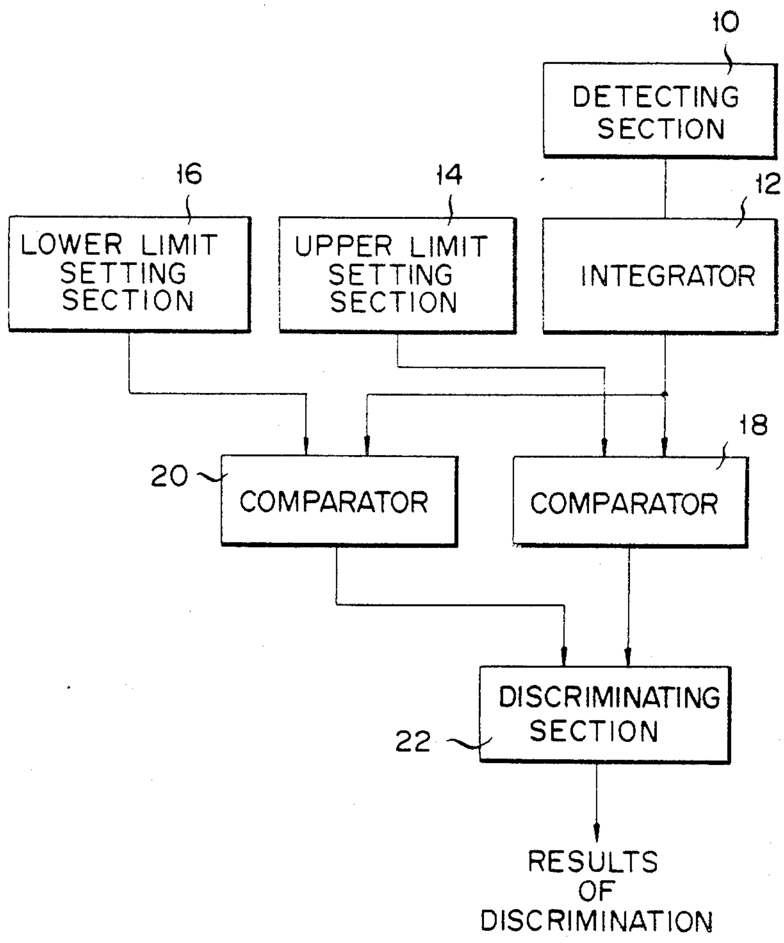
FIG. 1 (PRIOR ART)
FIG. 1 is a block diagram schematically showing the configuration of a conventional paper currency discriminating apparatus.
Figure 2:
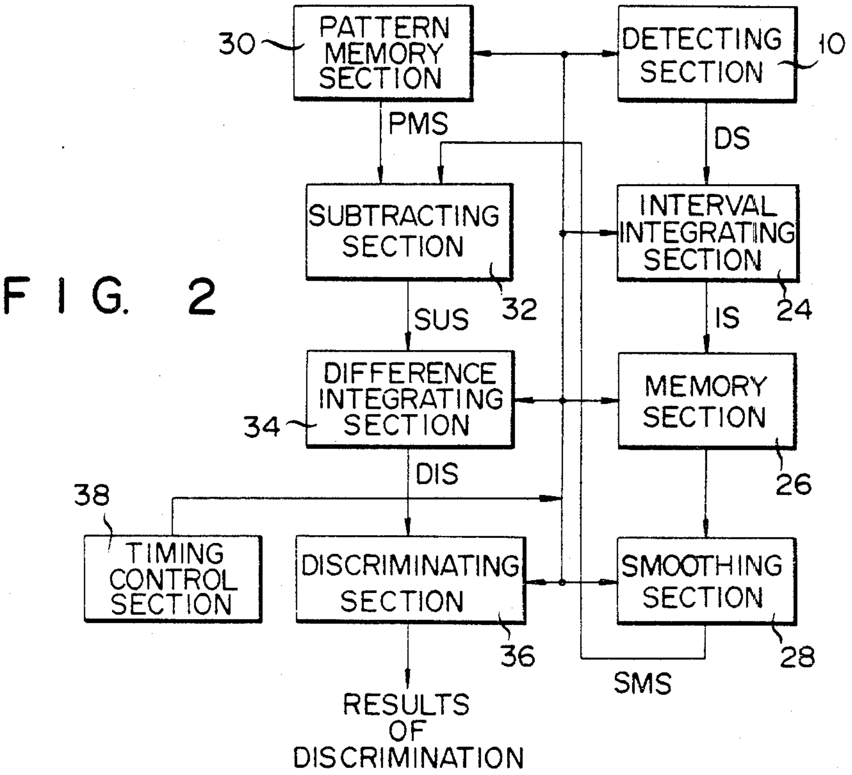
FIG. 2 is a block diagram schematically showing the configuration of a first embodiment of the present invention wherein a pattern discriminating apparatus is applied to a paper currency discriminating apparatus.

FIG. 2 is a block diagram schematically showing the configuration of the first embodiment when a pattern discriminating apparatus of the present invention is applied to a paper currency discriminating apparatus.

Referring to FIG. 2, the detecting section 10 magnetically and optically detects the characteristics (distribution) of a bill to be discriminated, such as magnetism, color, intensity or the like. An interval integrating section 24 divides the bill into 32 intervals and integrates output signals from the detecting section 10 for each of these intervals. A memory section 26 stores the signals obtained from the interval integrating section 24 representing the interval integrated values for all the intervals of the bill. A smoothing section 28 smooths the intensity distribution pattern of the bill formed by the output from the memory section 26. A pattern memory section 30 stores signals of integrated values for the respective intervals, these signals representing a reference intensity distribution pattern (to be referred to as a reference pattern hereinafter) of a predetermined property (magnetism, color, intensity or the like) of paper currency of various denominations. A subtracting section 32 obtains, for each of the intervals, a difference between the waveform pattern of a signal output from the smoothing section 28 and the waveform pattern of the signal output from the pattern memory section 30. A difference integrating section 34 integrates, for all the intervals, the pattern differences for the respective intervals obtained from the substracting section 32. A discriminating section 36 discriminates the authenticity, denomination, top or bottom surface or the like of the bill based on the voltage level of the signal representing the difference integrated value obtained from the difference integrating section 34. A timing control section 38 supplies control signals to the respective sections.

Figure 3:
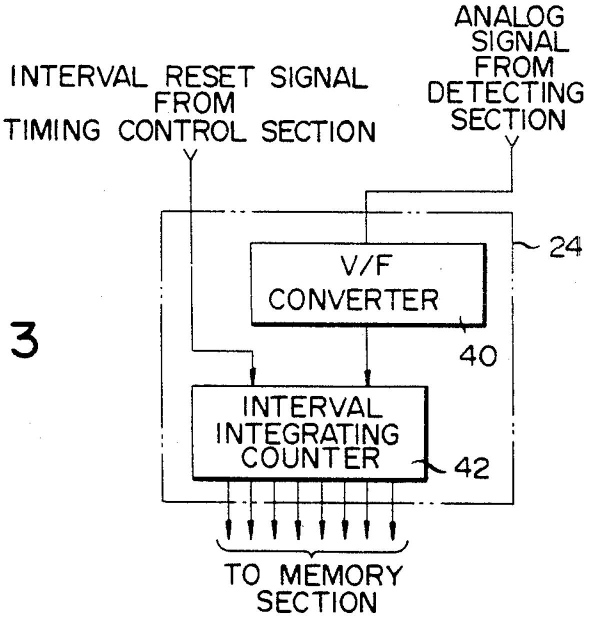
FIG. 3 is a block diagram schematically showing the configuration of an interval integrating section 24 shown in FIG. 2.

As shown in FIG. 3, the interval integrating section 24 is connected to the detecting section 10 and comprises a voltage to frequency converter 40 which produces a signal having a frequency proportional to the voltage of the detection signal output from the detecting section 10, and an interval integrating counter 42 which is connected to this voltage to frequency converter 40 and which counts pulses of the signal output from the converter 40. The interval integrating counter 42 is reset, each time counting for one interval is completed, by an interval reset signal output from the timing control section 38. When the total integrating interval is divided into 32 intervals for integration, 32 interval reset signals are supplied to the interval integrating counter 42. The interval integrating counter 42 produces the integrated value as an 8-bit signal.

Figure 4:
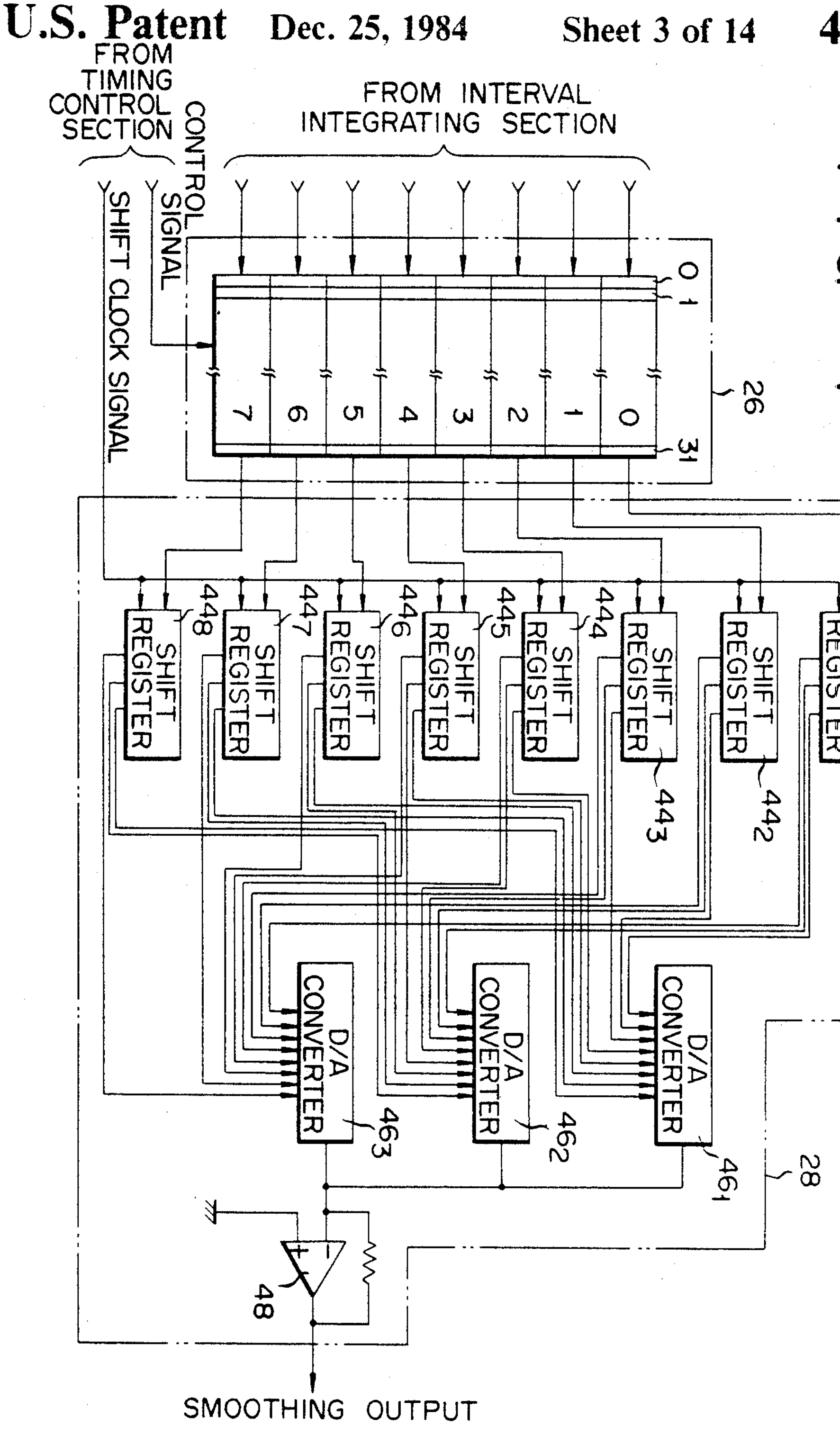
FIG. 4 is a block diagram schematically showing the configuration of a memory section 26 and a smoothing section 28 shown in FIG. 2.

The memory section 26 and the smoothing section 28 are of the configuration shown in FIG. 4. As shown in FIG. 4, the memory section 26 has a capacity which allows storage of 8-bit signals for 32 intervals.

The smoothing section 28 comprises, for example, shift registers $44_1$ to $44_8$ connected to the memory section 26, D/A converters $46_1$ to $46_3$ connected to these shift registers $44_1$ to $44_8$, and an amplifier 48. The shift registers $44_1$ to $44_8$ have first to third output terminals, respectively. The first output terminals of the shift registers $44_1$ to $44_8$ are connected to the first D/A converter $46_1$; the second output terminals thereof are connected to the second D/A converter $46_2$; and the third output terminals thereof are connected to the third D/A converter $46_3$. The output end of the first to third D/A converters $46_1$ to $46_3$ are connected commonly for connection to the input end of the amplifier 48. The smoothing section 28 of this configuration takes the mean value, for each interval, of these integrated values corresponding to three positions, that is, at the interval and at points immediately before and after this interval. The smoothing section 28 may alternatively be of the configuration wherein it compares, for each interval, the integrated values at the interval and at points immediately before and after this interval and selects the median value. This smoothing section 28 serves to reduce the adverse effects of shifts in position of the bills to be transported and noise generated in detection of the bills. The shift registers $44_1$ to $44_8$ shift input data in response to shift clock signals output from the timing control section 38.

Figure 5:
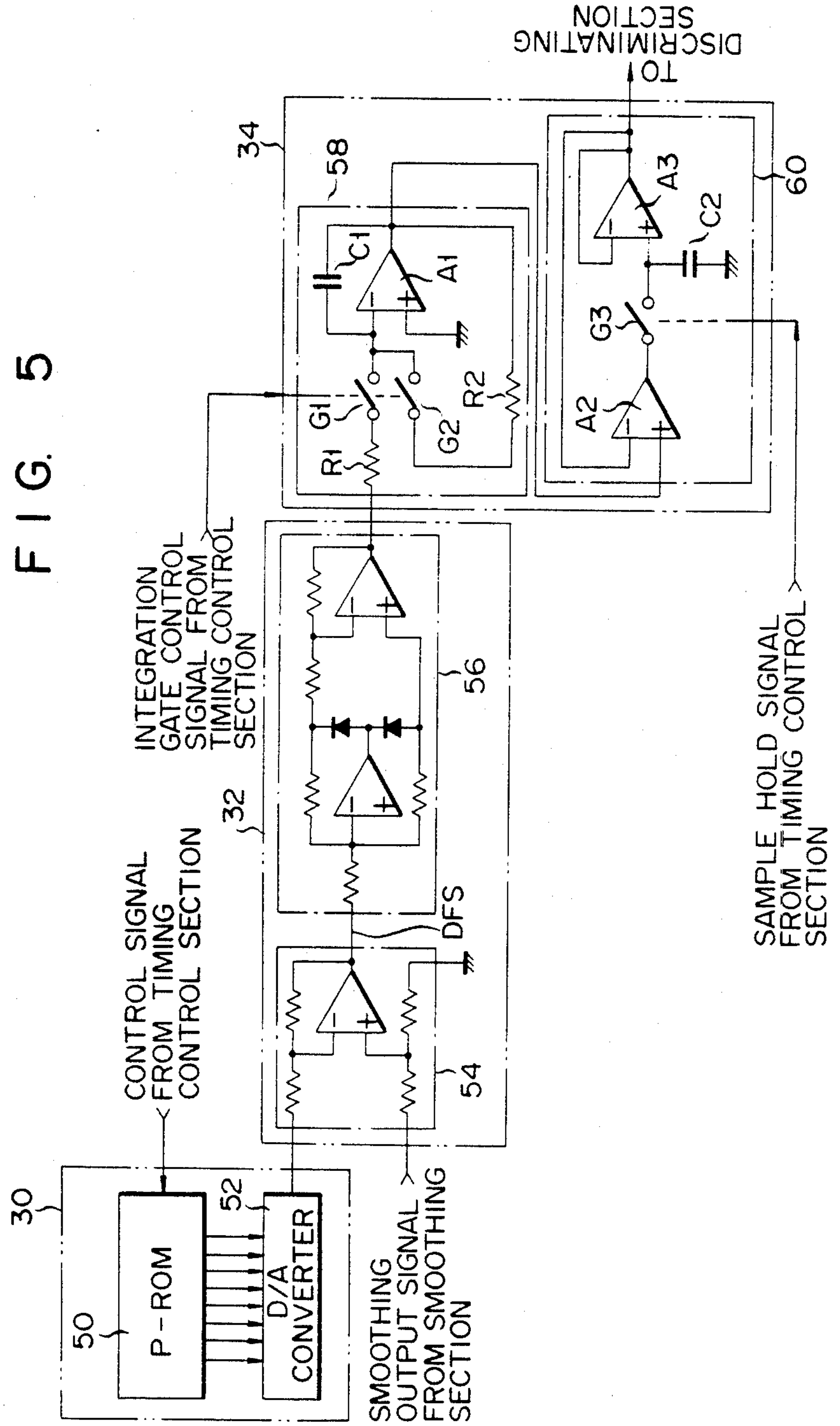
FIG. 5 is a circuit diagram showing the configuration of a pattern memory section 30, a subtracting section 32, and a difference integrating section 34 shown in FIG. 2.

FIG. 5 shows the configuration of the pattern memory section 30, the substracting section 32, and the difference integrating section 34. The pattern memory section 30 comprises a P-ROM 50, and a D/A converter 52 which converts a digital signal output from the P-ROM 50 into an analog signal. The P-ROM 50 stores the reference pattern for each interval in units of 8 bits. The output from the P-ROM 50 is controlled by a control signal output from the timing control section 38.

The subtracting section 32 comprises a differential amplifier 54 and an absolute value circuit 56. An analog signal of the reference pattern from the pattern memory section 30 is supplied to one input end of the differential amplifier 54, and an analog signal of the data pattern from the smoothing section 28 is supplied to the other input end of the differential amplifier 54. The differential amplifier 54 takes the difference between the two analog signals and outputs a difference signal to the absolute value circuit 56. The absolute value circuit 56 takes the absolute value of the difference signal and outputs the absolute value to the difference integrating section 34.

The difference integrating section 34 comprises an integrating circuit 58, and a sample hold circuit 60. The integrating circuit 58 consists of resistors R1 and R2; a capacitor C1; an amplifier A1; and integration gates G1 and G2, one end of each being connected to the input end of the amplifier A1 and the other end of each being selectively connected to the resistors R1 and R2. These integration gates G1 and G2 are controlled by an integration gate control signal output from the timing control section 38. The sample hold circuit 60 consists of amplifiers A2 and A3; a capacitor C2; and a sample hold gate G3. The sample hold gate G3 is controlled by a sample hold signal output from the timing control section 38. The sample hold signal consists of one pulse which is output immediately before completion of the integration for each interval by the integrating circuit 58.

Figure 6:
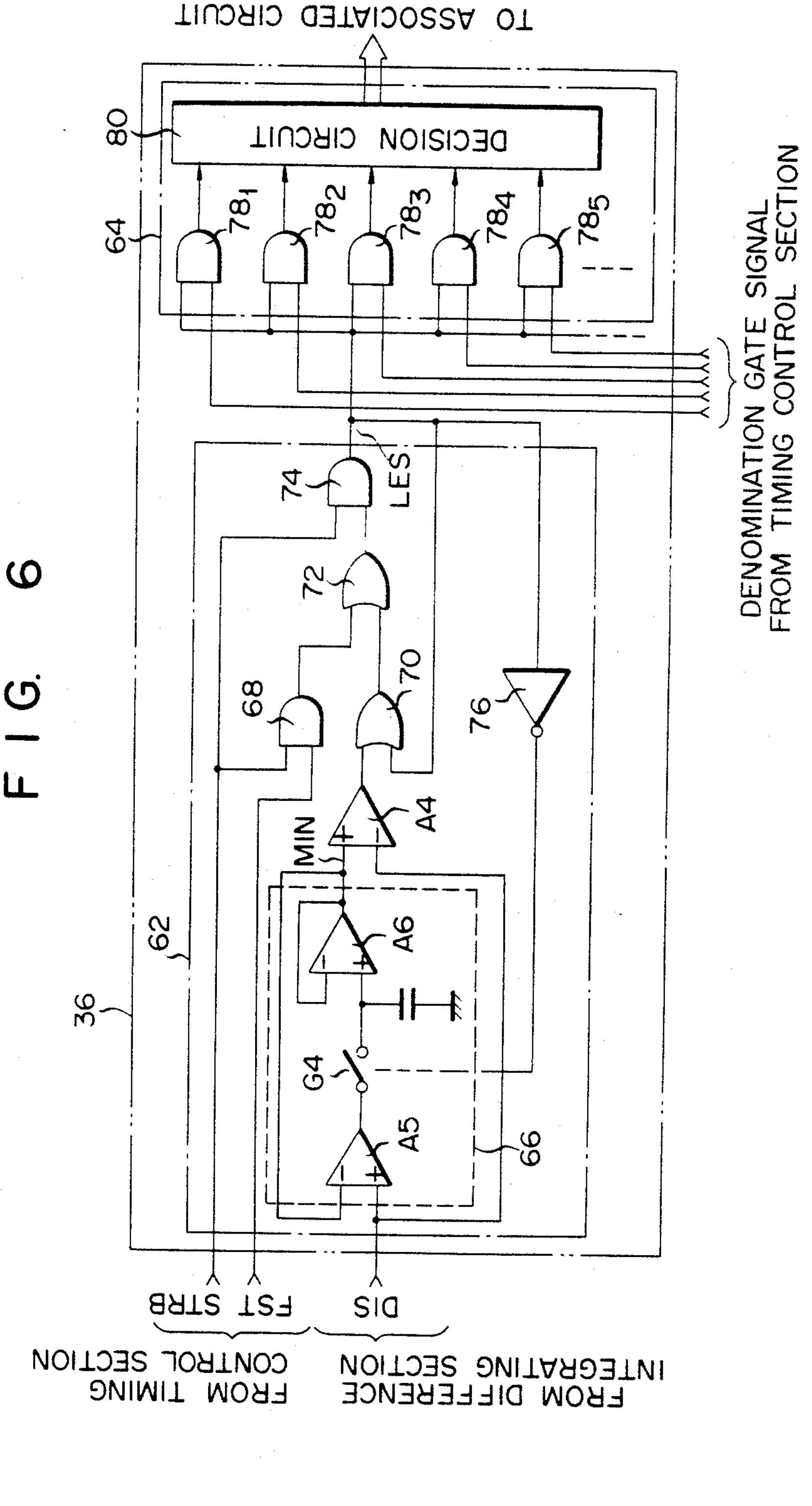
FIG. 6 is a circuit diagram showing the configuration of a discriminating section 36 shown in FIG. 2.

As shown in FIG. 6, the discriminating section 36 comprises a minimum value detection circuit 62 and a discriminating circuit 64. The minimum value detection circuit 62 consists of a sample hold circuit 66 of the same configuration as that of the sample hold circuit 60 of the difference integrating section 34; a comparator A4 which compares the output from the sample hold circuit 66 with the output from the difference integrating section 34; an AND circuit 68 which takes an AND product of a strobe signal STRB from the timing control section 38 and a pulse signal FST for initiating detection of the minimum value; an OR circuit 70 for receiving at one input end the output from the comparator A4; an OR circuit 72 which obtains an OR product of the output from the OR circuit 70 and the output from the AND circuit 68; an AND circuit 74 which takes an AND product of the output from the OR circuit 72 and the strobe signal STRB; and an inverter 76 which inverts the output from the AND circuit 74 and outputs a control signal for controlling a gate G4 of the sample hold circuit 66.

The discriminating circuit 64 consists of AND circuits $78_1$, $78_2$ and so on which take an AND product of denomination gate signals output from the timing control section 38 and a minimum value signal LES output from the minimum value detection circuit 62; and a decision circuit 80 which decides the authenticity, denomination, top or bottom surface and so on of the bill detected by the detecting section 10, based on the outputs from the AND circuits $78_1$, $78_2$ and so on.

Figures 7A, 7B, 7C, 7D, 7E, 7F, 7G, 7H:
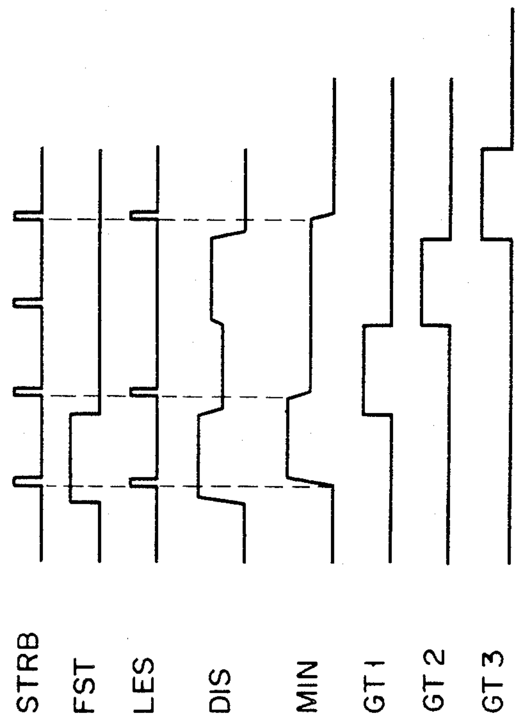
FIGS. 7A to 7H show waveforms for explaining the operation of the discriminating section 36.

A correlation integration signal DIS of the waveform as shown in FIG. 7D is supplied to the sample hold circuit 66 of the minimum value detection circuit 62, from the difference integrating secion 34. The sample hold circuit 66 holds the minimum value of the correlation integration signal DIS and produces a minimum value hold signal MIN of the waveform as shown in FIG. 7E. The comparator A4 compares the minimum value hold signal MIN with the correlation integration signal DIS. The comparison result is supplied through the OR circuits 70 and 72 to the AND circuit 74 which takes an AND product of the comparison result and the strobe signal STRB. The AND circuit 74 thus outputs the minimum value signal LES as shown in FIG. 7C. For the pulse signal FST shown in FIG. 7B, there is no correlation integration signal DIS to compare therewith. Therefore, the pulse signal FST is supplied to the discriminating section 36 from the timing control section 38 at the initiating point of the minimum value detection. The AND circuits $78_1$, $78_2$, and so on take an AND product of the minimum value signal LES with the denomination gate signals corresponding to each denomination of paper currency which is output from the timing control section 38. Denomination gate signals GT1, GT2, GT3, and so on are generated at the timings as shown in FIGS. 7F, 7G, and 7H. The denomination of bill of the minimum value is discriminated. The discrimination result is supplied to the decision circuit 80. The decision circuit 80 comprises, for example, latch circuits (not shown) which are arranged in correspondence with the AND circuits $78_1$, $78_2$ and so on; and a processing circuit (not shown) which discriminates the statuses of the latch circuits from the finial denomination of bills and which decides the denomination of bills, corresponding to the latch circuit which is first found to be latched, detected by the detecting circuit 10. The discrimination as to the top or bottom surface of the bill or the like is also performed with a circuit of the same configuration as the decision circuit 80.

The mode of operation of the apparatus of the configuration as described above will now be described. When a bill is supplied to the detecting section 10, the detecting section 10 detects a predetermined property (e.g., magnetism) of the entire area of the bill during a read time Q shown in FIG. 8A, and produces a detection signal DS as shown in FIG. 8B. The detection signal DS is supplied to the interval integrating section 24. The detection signal DS is converted at the voltage to frequency converter 40 shown in FIG. 3 to a signal having a frequency proportional to the voltage; this signal is supplied to the interval integrating counter 42. The interval integrating counter 42 is reset when the pulses of the signal output from the voltage to frequency converter 40 are counted for one interval; it then starts counting the pulses for the next interval. The integrated value obtained by the counting operation of the interval integrating counter 42 is supplied as a digital signal of 8 bits to the memory section 26 upon completion of integration for each interval. When the bill is divided into 32 intervals for integration, an interval integration signal IS is supplied to the memory section 26 thirty-two times. FIG. 9A shows the integration signal for the period corresponding to all the intervals wherein the pattern of one bill is shown during a time P in which the signal is output. The memory section 26 stores the integrated value for the transport period of the bill for all the intervals of the bill and outputs the integrated signal to the smoothing section 28 by sequential readout upon completion of transport. The memory section 26 outputs a signal of the waveform pattern as shown in FIG. 9A. The signal output from the memory section 26 is smoothed at the smoothing section 28 and is converted to a signal SMS of the waveform pattern as shown in FIG. 9B. FIG. 9B shows the analog signal SMS output from the smoothing section 28 in correspondence with the signal IS shown in FIG. 9A. The signal SMS is output 16 times during operation time R shown in FIG. 8A. The number of times the signals SMS are generated is determined by the number of waveform patterns to be compared with the waveform pattern of the signal SMS.

The signal SMS is supplied to the subtracting section 32. The subtracting section 32 obtains, for each waveform pattern of both signals, the difference between the reference pattern signal PMS from the pattern memory section 30 as shown in FIG. 10A and the smoothing signal SMS from the smoothing section 28 as shown in FIG. 10B. As a consequence, the subtraction output signal DFS as shown in FIG. 10C is output from the differential amplifier 54. The absolute value circuit 56 takes the absolute value of the subtraction output signal DFS and outputs a signal SUS as shown in FIG. 10D to the difference integrating section 34. The signal SUS is integrated at the difference integrating section 34 for each interval, is converted to the correlation integration signal DIS as shown in FIG. 10E, and is supplied to the discriminating section 36. It is seen from FIGS. 10A and 10B that the fourteenth reference pattern S14 of the reference pattern signal PMS most resembles the waveform pattern of the smoothing signal SMS shown in FIG. 10B. The signals DFS and SUS shown in FIGS. 10C and 10D become minimum in correspondence with the fourteenth pulse of the reference pattern signal PMS. As a result of this, the correlation integration signal DIS shown in FIG. 10E becomes minimum. Based on the reference pattern corresponding to the period in which the correlation integration signal DIS is minimum, the discriminating section 36 discriminates the denomination of bill, the top or bottom surface of the bill and so on and outputs the discrimination result.

According to the embodiment described above, the bill is divided into 32 intervals. The output signals from the detecting section 10 are integrated for each of these intervals and the integrated value for each interval is stored. The stored integrated value is repeatedly read out to smooth the patterns formed by the integrated values of the respective intervals. The difference between the smoothing patterns and the reference patterns is obtained, and the difference is integrated for each pattern. Discrimination on the authenticity, denomination, and top or bottom surface of the bill is performed based on the difference integrated value. Therefore, with the apparatus of this embodiment, more correct discrimination may be made than with a conventional apparatus which discriminates based on the total integrated value. Even if bills of different denominations are mixed in, they may be correctly discriminated. Since the interval integrated value is smoothed, the adverse effects of the variations in the transporting speed of the bill or the partial damage of the bill are eliminated, and the discrimination result becomes more reliable.

Figure 11:
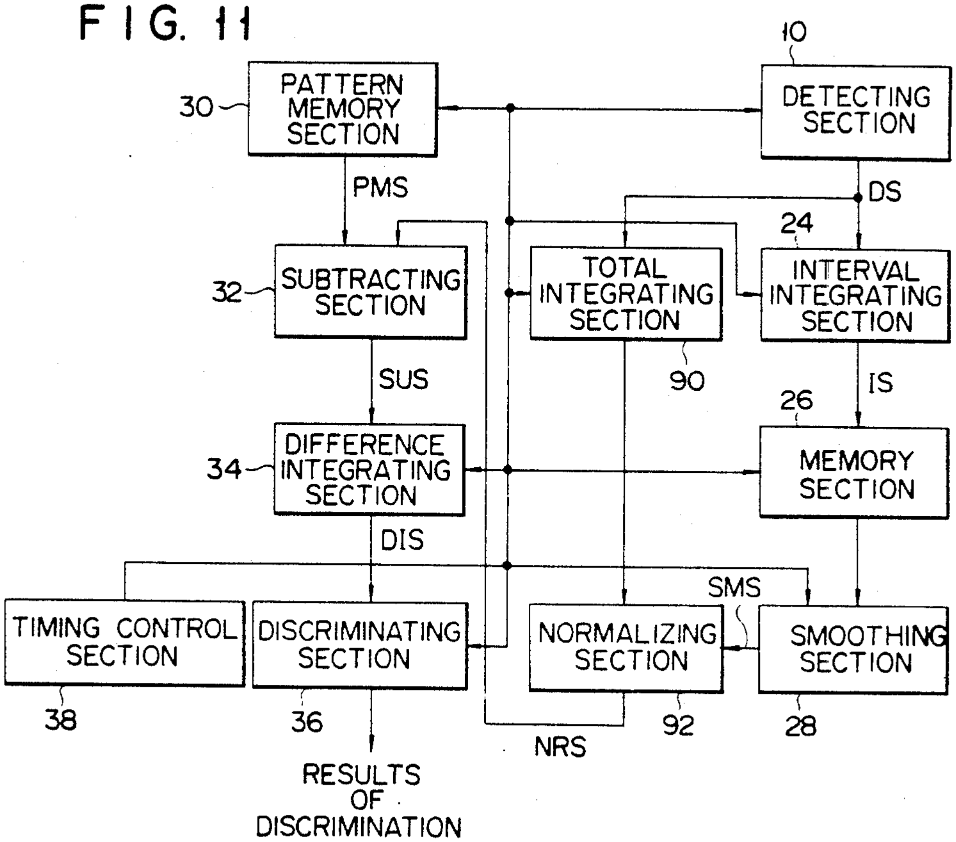
FIG. 11 is a block diagram schematically showing the configuration of a second embodiment of the present invention when a pattern discriminating apparatus is applied to a paper currency discriminating apparatus.

FIG. 11 is a block diagram schematically showing the configuration of the second embodiment when a pattern discriminating apparatus according to the present invention is applied to a paper currency discriminating apparatus. The same reference numerals in FIG. 11 as those in FIG. 2 denote the same parts.

The second embodiment shown in FIG. 11 differs from the first embodiment shown in FIG. 2 in that a total integrating section 90 and a normalizing section 92 are added to the configuration of the first embodiment.

Figure 12:
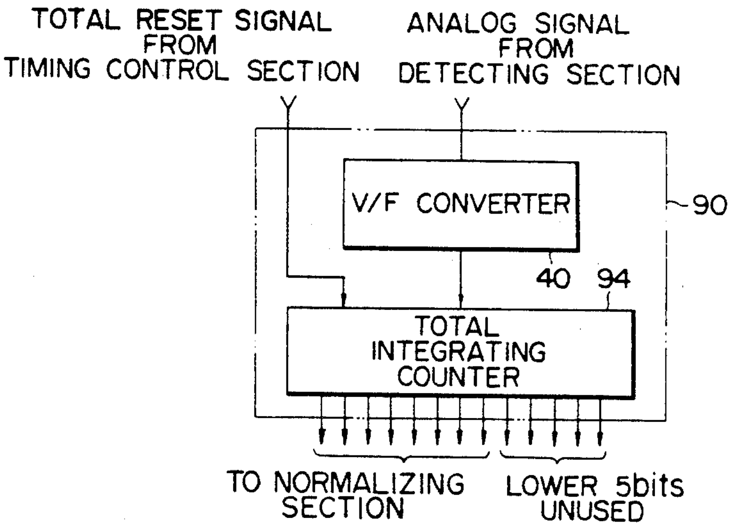
FIG. 12 is a block diagram schematically showing the configuration of a total integrating section 90 shown in FIG. 11.

The total integrating section 90 integrates the output signals from the detecting section 10 for all the bills transported. As shown in FIG. 12, the total integrating section 90 consists of a voltage to frequency converter 40 which converts the output signal from the detecting section 10 to a signal having a frequency proportional to the voltage level thereof; and a total integrating counter 94 which is connected to the voltage to frequency converter 40 and which counts pulses of the signal output from the converter 40. The total integrating counter 94 is reset by the total reset signal output from the timing control section 38 when counting for one bill is completed. Therefore, one pulse is supplied from the timing control section 38 to the total integrating counter 94 when one bill is completely transported. The total integrating counter 94 obtains, for example, outputs of about 13 bits and outputs the upper eight bits as the integrated value. According to this second embodiment of the present invention, the voltage to frequency converter 40 is commonly used for the interval integrating section 24 and the total integrating section 90.

When the reference pattern output from the pattern memory section 30 is compared with the data pattern (the pattern of the detection signals which are integrated for each interval and smoothed) output from the smoothing section 28 at the subtracting section 32, correct comparison may not be made depending upon the quality of the bill, changes in the sensitivity of the magnetic sensors, and so on, if there are variations in the intensity of the data pattern. In order to prevent this, the normalizing section 92 divides the data pattern by the total integrated value output from the total integrating section 90, so that the area of the data pattern is kept constant independently of the quality of the bill and so on. As shown in FIG. 13, the normalizing section 92 consists of a multiplication type D/A converter 96 which divides the output from the smoothing section 28 by the total integrated value from the total integrating section 40; and a current to voltage converter 98 which converts the output from the converter 96 to a voltage signal. FIG. 13 further schematically shows the interval integrating section 24, the total integrating section 90, the memory section 26, and the smoothing section 28 together with the connections of these sections with the normalizing section 92.

The mode of operation of the second embodiment of the configuration as described above will now be described.

When a bill is supplied to the detecting section 10, the detecting section 10 detects the bill while it transports it, and outputs a detection signal to the interval integrating section 24. As has been described with reference to the first embodiment, the interval integrating section 24 detects for each interval the bill which is divided into 32 intervals and outputs a signal of the waveform pattern as shown in FIG. 14A for all the intervals to the memory section 26. The memory section 26 stores, during the transport of the bill, the interval integrated signals, and sends a signal of the waveform resembling that shown in FIG. 14A to the smoothing section 28. As has been described with reference to the first embodiment, the smoothing section 28 smooths, for the respective intervals, the waveform pattern as shown in FIG. 14A to obtain the waveform pattern as shown in FIG. 14B and outputs a signal of this waveform pattern to the normalizing section 92. The normalizing section 92 divides the signal from the smoothing section 28 by the total integrated value output from the total integrating section 90 to produce a normalized output NRS of the waveform pattern as shown in FIG. 14C. The area of the waveform pattern of the normalized output NRS is kept constant independently of the magnitude of the input. The normalized output NRS is then output to the subtracting section 32.

Since the subsequent signal processing is the same as that in the case of the first embodiment, a description thereof will be omitted.

In summary, the second embodiment has the advantageous effects of the first embodiment as well as the advantageous effect obtainable with the normalization of the data pattern. More specifically, since the normalization of the magnitude of the data pattern is performed in the second embodiment, discrimination may be correctly performed even if there are variations in the bill pattern supplied to the detecting section 10 or variations in the sensitivity of the detecting section 10, unless there is a change in the pattern of the bill.

Figure 15:
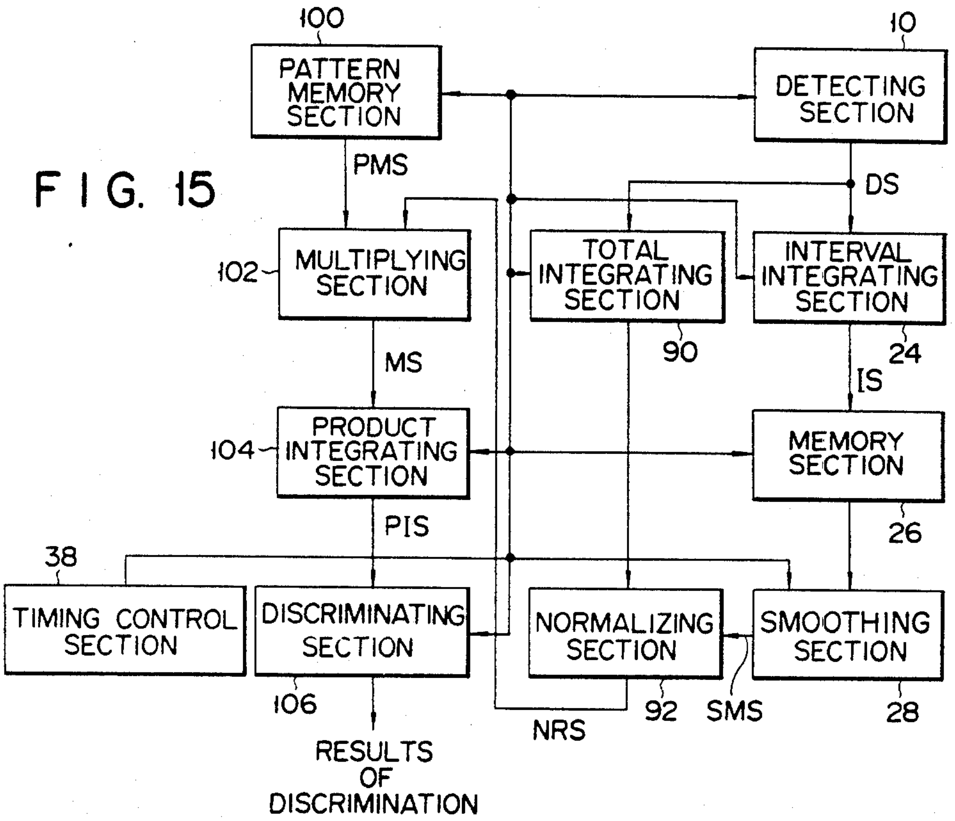
FIG. 15 is a block diagram schematically showing the configuration of a third embodiment when a pattern discriminating apparatus of the present invention is applied to a paper currency discriminating apparatus.

FIG. 15 is a block diagram schematically showing the configuration of the third embodiment when a pattern discriminating apparatus of the present invention is applied to a paper currency discriminating apparatus. The same reference numerals in FIG. 15 as those in FIG. 11 denote the same parts.

The configuration of the third embodiment shown in FIG. 15 differs from the configuration of the second embodiment shown in FIG. 11 in that the subtracting section 32 of the second embodiment is replaced by a multiplying section 102 and, the pattern memory section 30 and the discriminating section 36 are correspondingly modified.

Figure 16:
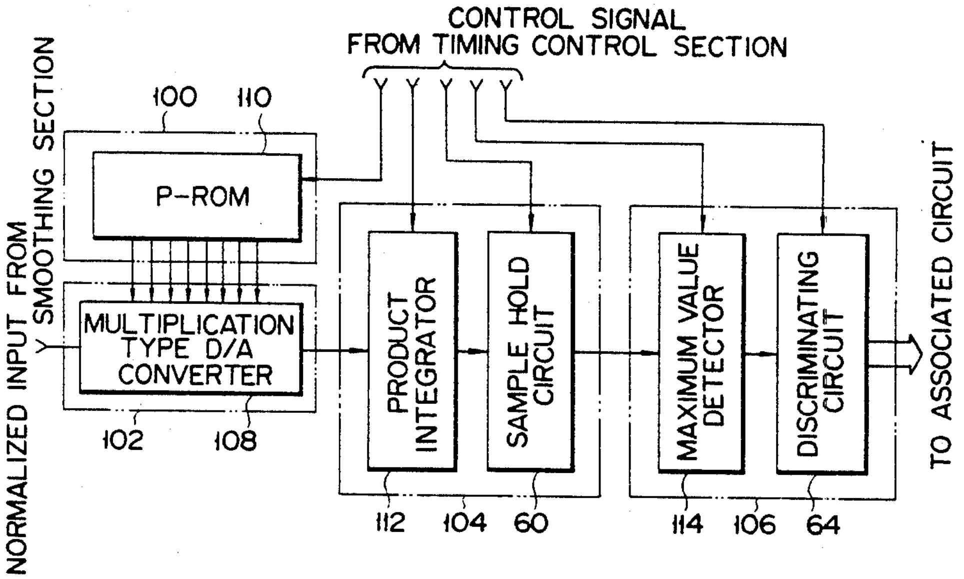
FIG. 16 is a block diagram schematically showing the configuration of a pattern memory section 100, a multiplying section 102, a product integrating section 104, and a discriminating section 106 shown in FIG. 15.

The multiplying section 102 comprises a multiplication type D/A converter 108 as shown in FIG. 16. The multiplication type D/A converter 108 obtains a product of the 8-bit reference pattern signal output from the pattern memory section 100 and the normalized signal output from the normalizing section 92. FIG. 16 further shows the pattern memory section 100, the product integrating section 104, and the discriminating section 106 together with the connections of these sections with the multiplication type D/A converter 108. The pattern memory section 100 comprises a P-ROM 110. The product integrating section 104 comprises a product integrator 112 and the sample hold circuit 60, and the configuration of it is the same as that of the difference integrating section 34 of the second embodiment. The discriminating section 106 comprises a maximum value detector 114 which detects the maximum value of the respective interval integrated values output from the product integrating section 104; and the discriminating circuit 64 which discriminates the denomination of the bill or the like which is detected at the detecting section 10.

The mode of operation of the third embodiment of the configuration as described above will now be described. The signal processing from the detecting section 10 to the normalizing section 92 is the same as the signal processing according to the second embodiment.

When the normalized data pattern signal as shown in FIG. 17B is supplied from the normalizing section 92 to the multiplying section 102, the 8-bit reference pattern signal is supplied from the pattern memory section 100 to the multiplying section 102. FIG. 17A shows the waveform of the analog signal obtained by converting the 8-bit reference pattern signal at the multiplication type D/A converter 108. The multiplying section 102 multiplies the waveform shown in FIG. 17A by the waveform shown in FIG. 17B to obtain the waveform shown in FIG. 17C. The product signal MS shown in FIG. 17C is supplied to the product integrating section 104. The product integrating section 104 integrates the product signal MS, samples and holds it to supply an integrated signal PIS as shown in FIG. 17D to the discriminating section 106. It is seen from FIGS. 17A and 17B that the fourteenth reference pattern S14 shown in FIG. 17A most resembles the pattern of the normalized signal shown in FIG. 17B. The product signal MS corresponding to the fourteenth reference pattern, shown in FIG. 17C, becomes maximum, and a correlation integration signal PIS shown in FIG. 17D becomes maximum. Based on the correlation integration signal PIS of the maximum value, the discriminating section 106 discriminates the denomination of the bill, top or bottom surface of the bill or the like and outputs the discrimination result.

Therefore, the third embodiment of the present invention has the same effects as the second embodiment.

Figure 18:
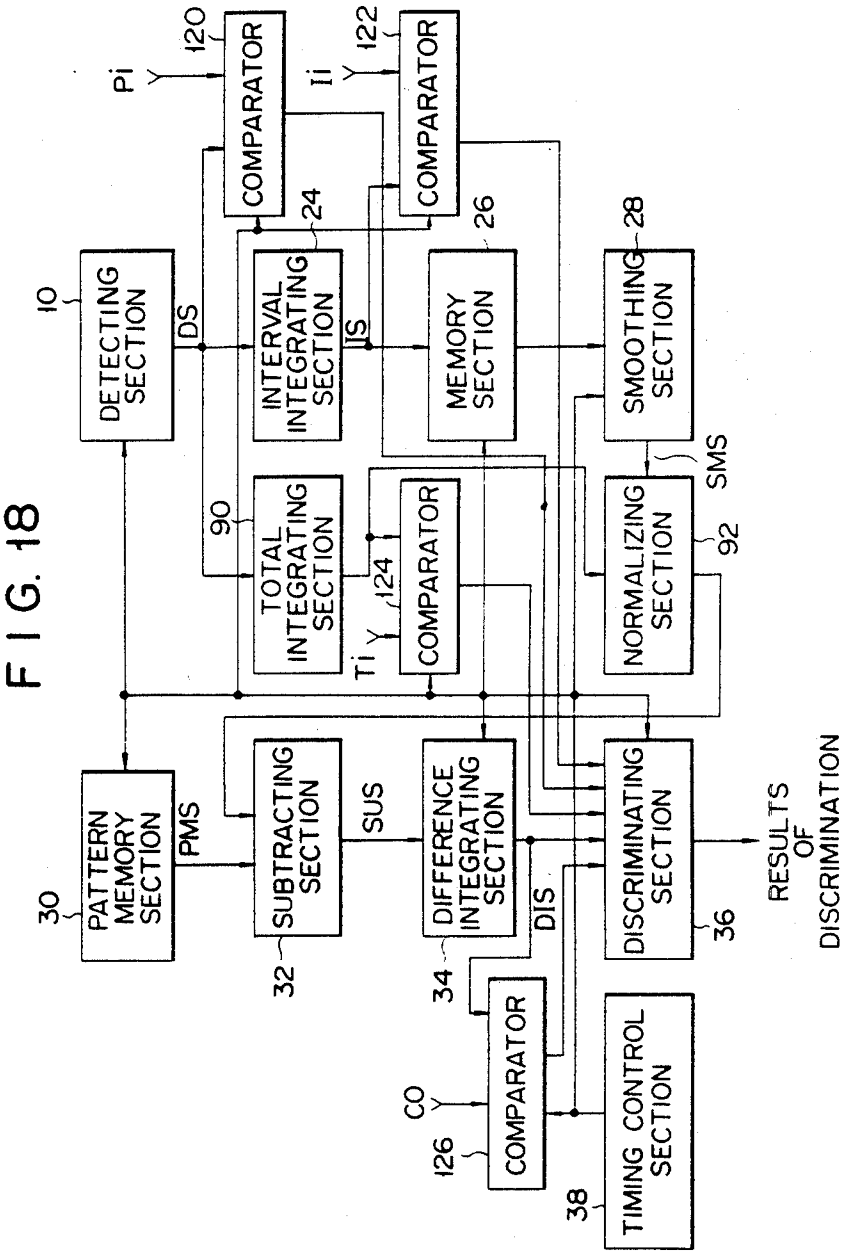
FIG. 18 is a block diagram schematically showing the configuration of a fourth embodiment when a pattern discriminating apparatus of the present invention is applied to a paper currency discriminating apparatus.

FIG. 18 is a block diagram schematically showing the configuration of the fourth embodiment when a pattern discriminating apparatus of the present invention is applied to a paper currency discriminating apparatus. The same reference numerals in FIG. 18 as those in FIG. 11 denote the same parts.

The configuration of the fourth embodiment shown in FIG. 18 differs from the configuration of the second embodiment shown in FIG. 11 in that a peak level comparator 120, an interval integration level comparator 122, a total integration level comparator 124, and a correlation level comparator 126.

The peak level comparator 120 is, for example, of the configuration as shown in FIG. 19 in order to discriminate five different denominations of paper currency. The peak level comparator 120 shown in FIG. 19 consists of resistors $128_1$ to $128_5$ for setting peak levels P1 to P5 corresponding to five different denominations of paper currency, comparators $130_1$ to $130_5$ which compare the levels of the signals supplied from the resistors $128_1$ to $128_5$ with levels of the detection signals DS supplied from the detecting section 10, latch circuits $132_1$ to $132_5$ which are operated by the outputs from the comparators $130_1$ to $130_5$, inverters $134_1$ to $134_5$ which are turned on and off by the control signal and which invert the signals output from the latch circuits $132_1$ to $132_5$, and a switch circuit 136 which supplies the control signal to these inverters $134_1$ to $134_5$. The signals $P_{11}$ to $P_{51}$ are output when the inverters $134_1$ to $134_5$ are on.

Figure 20:
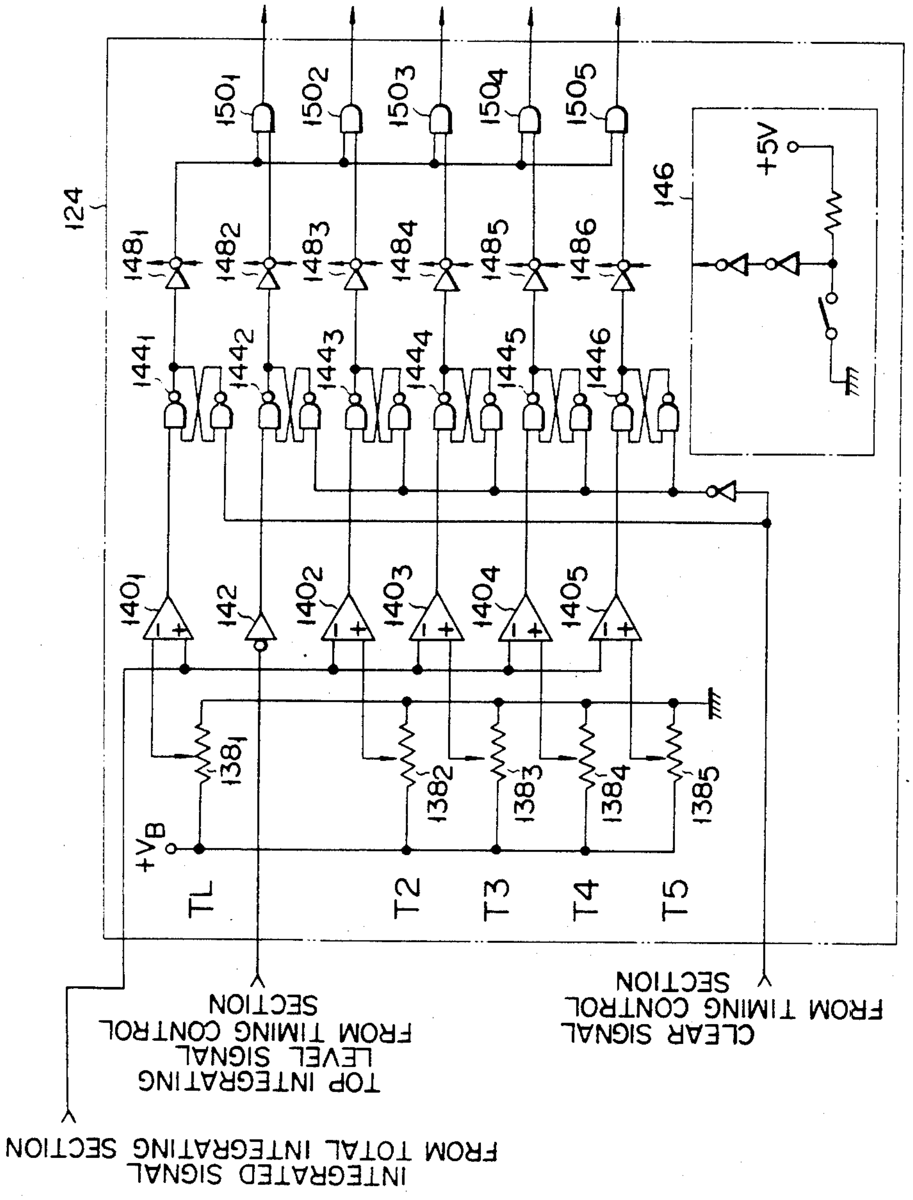
FIG. 20 is a circuit diagram showing the configuration of a total integration level comparator 124 shown in FIG. 18.

In order to discriminate, for example, five different denominations of paper currency, the total integration level comparator 124 consists of, as shown in FIG. 20, resistors $138_1$ to $138_5$ for setting the total integration levels T1 to T5 corresponding to five different denomination of paper currency; comparators $140_1$ to $140_5$ which compare the level of the signals output from the resistors $138_1$ to $138_5$ with the level of the total integration signals supplied from the total integeating section 90; latch circuits $144_1$ to $144_6$ which operate in response to the outputs of the comparators $140_1$ to $140_5$ and the output from the inverter 142; inverters $148_1$ to $148_6$ which invert the outputs from the latch circuits $143_1$ to $143_6$ and which are turned on and off by switching signal output from a switch circuit 146; and AND circuits $150_1$ to $150_5$ which take AND products of the outputs from the latch circuit $144_1$ representing the lower limit of the total integration level and supplied through the inverter $148_1$ and the respective total integration levels supplied from the other latch circuits $144_2$ to $144_6$ through the other inverters $148_2$ to $148_6$, and produce output signals T11 to T51.

The configuration of the interval integration level comparator 122 is the same as that of the total integration level comparator 124 shown in FIG. 120 except for the control signal supplied from the timing control section 38.

Figure 21:
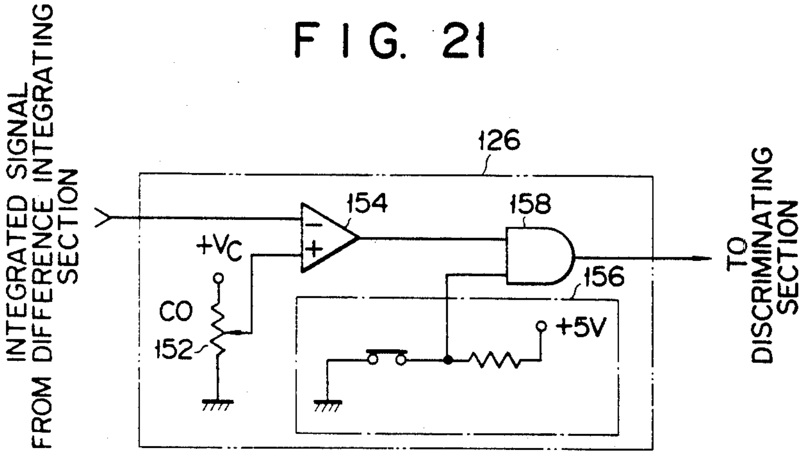
FIG. 21 is a circuit diagram showing the configuration of a correlation level comparator 126 shown in FIG. 18.

The correlation level comparator 126 is, for example, of the configuration as shown in FIG. 21, and comprises a resistor 152 for setting the correlation pattern level range CO; a comparator 154 which compares the level of the signal supplied from the resistor 152 with the level of the correlation integration signal DIS supplied from the difference integrating section 34; and an AND circuit 158 which takes an AND product of the output from the comparator 154 and the output from the switch circuit 156 and supplies this AND product to the discriminating section 36.

The mode of operation of the fourth embodiment of the configuration as described above will now be described. The signal processing from the detecting section 10 to the difference integrating section 34 is the same as that of the second embodiment. According to the fourth embodiment, the functions of the comparators 120, 122, 124 and 126 are added to the functions of the second embodiment to improve the discrimination precision of the apparatus according to the present invention.

Figure 22A:
FIGS. 22A, 22B and FIG. 23 show waveforms for explaining the operation of the apparatus according to the fourth embodiment.

The detection signal DS from the detecting section 10 is supplied to the peak level comparator 120. The peak level comparator 120 compares, as shown in FIG. 22A, the levels Pi (P1 to P5) set in accordance with the respective denominations of paper currency with the detection signals DS, sets the latch circuits $132_1$ to $132_5$ corresponding to the respective levels, and produces output signals P11 to P52 to the discriminating section 36.

Figure 22B:
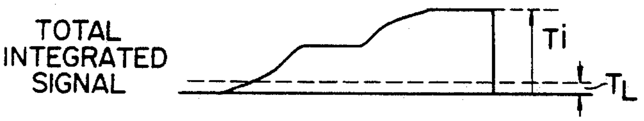
Figure 23:
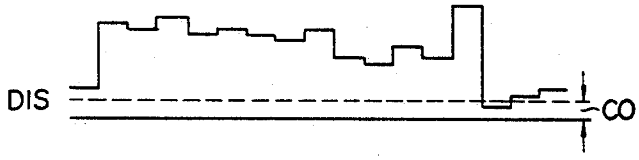

The total integration signal supplied from the total integrating section 90 is supplied to the total integration level comparator 124. The total integration level comparator 124 compares the input total integration signal with upper limits Ti (T2 to T5) and lower limit TL determined in accordance with the corresponding denominations of bills to determine if the total integration signal falls within the range specified for the denomination of bill involved as shown in FIG. 22B. The total integration level comparator 124 sets the latch circuits $144_1$ to $144_6$ corresponding to the respective levels to supply the output signals T11 to T51 to the discriminating section 36. FIG. 22B shows as an analog waveform for easy understanding the total integration signal which is output in the form of a digital signal.

The operation of the interval integration level comparator 122 is the same as the total integration level comparator 124.

The correlation integration signal DIS supplied from the difference integrating section 34 is supplied to the correlation level comparator 126. The correlation level comparator 126 compares the correlation integration signal DIS with the range CO to determine if the correlation integration signal DIS falls within the range CO as shown in FIG. 22C. If the correlation integration signal DIS is within the range CO, the correlation level comparator 126 supplies a signal of logic value "1" to the discriminating section 36.

The discriminating section 36 receives, in addition to the signal from the difference integrating section 34, the signals from the peak level comparator 120, the interval integration level comparator 122, the total integration level comparator 124, and the correlation level comparator 126. Based on these received signals, the discriminating section 36 determines the denomination of bill or the like of the bill which is detected at the detecting section 10.

Therefore, according to the fourth embodiment, the levels of the outputs from the detecting section 10, the interval integrating section 24, the total integrating section 90, and the difference integrating section 34 are compared with the levels which are present in accordance with the denominations of bills, and the comparison results are used as data for bill discrimination at the discriminating section 36, so that the discrimination precision of bills may be improved in addition to the effects of the second embodiment.

The present invention is not limited to the first to fourth embodiments described above. For example, the smoothing section 28 is used in the first to fourth embodiments described above. However, this section 28 may be omitted as long as there are no variations in the transporting speed of the bill or no partial damage of the bill. Furthermore, in the first to fourth embodiments described above, the integration by the interval integrating section 24 and the total integrating section 90 is digitally performed. However, this integration may be performed in an analog manner. In this case, the related circuits must be modified accordingly. The first to fourth embodiments of the present invention may be combined as needed.

It is, therefore, to be understood that various other changes and modifications may be made within the spirit and scope of the present invention.

What we claim is:

1. A pattern discriminating apparatus comprising:

detecting means for detecting a pattern of at least one property among properties of an object to be discriminated;

first integrating means for integrating detection signals from said detecting means for each of a plurality of intervals of a readout surface of the object to be discriminated, said plurality of intervals being divided along the direction of movement of the object to be discriminated;

first memory means for storing signals for all of the intervals of the readout surface, each signal output from said first integrating means representing an interval integrated value, and for outputting the signals stored as data signals during readout;

means for smoothing, for each interval, signals from the first memory means, which correspond to that interval and its adjacent intervals, in order to obtain the mean value of the corresponding integrated values thereby reducing the effects of misalignment between the pattern and the detecting means;

second memory means for storing, in advance, an integrated value corresponding to a reference pattern of the property detected by said detecting means for each of the intervals and for outputting the integrated values as reference signals during readout;

operating means for calculating for each of the intervals a comparison value between waveform patterns of the data signals output by said smoothing means and waveforem patterns of the reference signals output by said second memory means;

second integrating means for integrating the comparison values of the waveform patterns obtained by said operating means for all of the intervals of the object to be discriminated; and discriminating means for discriminating, based on the integrated value from said second integrating means, coincidence between the reference pattern and the pattern of the property of the readout surface of the object to be discriminated.

2. A pattern discriminating apparatus according to claim 1, further comprising total integrating means for integrating the detection signals output from said detecting means over the entire readout surface of the object to be discriminated; and normalizing means for normalizing a magnitude of the waveform pattern of each of the signals representing the interval integrated values by determining the ratio of a signal representing a total integrated value and output from said total integrating means to the signal representing the interval integrated value stored in said first memory means, and for outputting a normalized signal to said operating means.

3. A pattern discriminating apparatus according to claim 1, further comprising total integrating means for integrating the detection signals output from said detecting means over the entire readout surface of the object to be discriminated; and normalizing means for normalizing a magnitude of the waveform pattern of each of the signals representing the interval integrated values by determining the ratio of a signal representing a total integrated value and output from said total integrating means to the signal representing the interval integrated value stored in said first memory means and output through said smoothing means and for outputting a normalized signal to said operating means.

4. A pattern discriminating apparatus according to claim 1, further comprising a comparing circuit which discriminates if at least one of the signals output from said detecting means, said first integrating means, and said second integrating means is within a predetermined level range which is preset in accordance with the object to be discriminated.

5. A pattern discriminating apparatus according to claim 2 or 3, further comprising a comparing circuit which discriminates if at least one of the signals output from said detecting means, said first integrating means, and said second integrating means is within a predetermined level range which is preset in accordance with the object to be discriminated.

6. A pattern discriminating apparatus according to any one of claims 1, 2 or 3, wherein said first integrating means comprises a voltage to frequency converter which converts the detection signal output from said detecting means to a signal of a frequency proportional to a voltage level thereof; and a counter which counts the pulses of a signal output from said voltage to frequency converter for each of said intervals to obtain the interval integrated values.

7. A pattern discriminating apparatus according to claim 2 or 3, wherein said total integrating means comprises a voltage to frequency converter which converts the detection signal output from said detecting means to a signal of a frequency proportional to a voltage level thereof; and a counter which counts the pulses of a signal output from said voltage to frequency converter for each of said intervals to obtain the interval integrated values.

8. A pattern discriminating apparatus according to any one of claims 1, 2 or 3, wherein said smoothing means comprises shift registers which receive and shift the signal output from said first memory means and which simultaneously parallel-output the interval integrated values for the plurality of intervals; D/A converters for converting digital signals output from said shift registers into analog signals for each of the intervals; and an amplifying circuit which takes a mean value of outputs from said D/A converters.

9. A pattern discriminating apparatus comprising:

detecting means for detecting a pattern of at least one property among properties of an object to be discriminated;

first integrating means for integrating detection signals from said detecting means for each of a plurality of intervals of a readout surface of the object to be discriminated, said plurality of intervals being divided along the direction of movement of the object to be discriminated;

first memory means for storing signals for all of the intervals of the readout surface, each signal output from said first integrating means representing an interval integrated value, and for outputting the signals stored as data signals during readout second memory means for storing, in advance, an integrated value corresponding to a reference pattern of the property detected by said detecting means for each of the intervals and for outputting the integrated values as references signals during readout;

operating means for calculating for each of the intervals a comparison value between waveform patterns of the data signals output by said first memory means and waveforms patterns of the reference signals output by said second memory means including a subtracting circuit, said subtracting circuit comprising a differential amplifier for taking a difference between a data signal output from said first memory means and the reference signal output from said secondary memory means, and an absolute value circuit which takes an absolute value of difference signal output from said differential amplifier;

second integrating means for integrating the comparison values of the waveform patterns obtained by said operating means for all of the intervals of the object to be discriminated; and discriminating means for discriminating, based on the integrated value from said second integrating means, coincidence between the reference pattern and the pattern of the property of the readout surface of the object to be discriminated.

10. A pattern discriminating apparatus according to claim 1, wherein said operating means comprises a subtracting circuit, said subtracting circuit comprising a differential amplifier for taking a difference between a data signal output from said smoothing means and the reference signal output from said second memory means, and an absolute value circuit which takes an absolute value of a difference signal output from said differential amplifier.

11. A pattern discriminating apparatus according to claim 2 or 3, wherein said operating means comprises a subtracting circuit, said subtracting circuit comprising a differential amplifier for taking a difference between a data signal output from said normalizing means and the reference signal output from said second memory means, and an absolute value circuit which takes an absolute value of a difference signal output from said differential amplifier.

12. A pattern discriminating apparatus according to any one of claims 1, 2 or 3, wherein said operating means comprises multiplying means which, in turn, comprises, a multiplication type A/D converter.

13. A pattern discriminating apparatus according to any one of claims 1, 2 or 3, wherein said comparing circuit comprises a level setting circuit which sets a predetermined level according to the object to be discriminated; and a differential amplifier which compares a level of a signal output from said level setting circuit with a level of an input signal.

* * * * *

UNITED STATES PATENT AND TRADEMARK OFFICE

CERTIFICATE OF CORRECTION

PATENT NO. : 4,490,846

DATED : December 25, 1984

INVENTOR(S) : Tsuyoshi Ishida, Hideo Osawa and Kazuaki Naruse

It is certified that error appears in the above-identified patent and that said Letters Patent is hereby corrected as shown below:

On the title page the Assignee should read as follows:

--TOKYO SHIBAURA DENKI KABUSHIKI KAISHA--.

Signed and Sealed this

*Tenth* Day of *September 1985*

[SEAL]

*Attest:*

DONALD J. QUIGG

*Attesting Officer* *Acting Commissioner of Patents and Trademarks - Designate*